United States Patent
Khutoretsky et al.

[11] 3,808,490
[45] Apr. 30, 1974

[54] CONTACT DEVICE OF SYNCHRONOUS ELECTRIC MACHINE

[76] Inventors: Garri Mikhailovich Khutoretsky, Altaiskaya ulitsa, 20, kv. 5; Gurgen Petrosovich Vartanian, Budapeshtskaya ulitsa 15, korpus 2, kv. 29; Sergei Grigorevich Milchuk, prospekt Slavy, 17, korpus 1, kv. 117, all of Leningrad, U.S.S.R.

[22] Filed: Jan. 22, 1973

[21] Appl. No.: 325,926

[52] U.S. Cl................... 310/165, 310/231, 310/261
[51] Int. Cl. ......................................... H02k 13/00
[58] Field of Search....... 310/68, 71, 129, 130, 165, 310/139, 219, 229, 231, 232, 247, 248, 261

[56] References Cited
UNITED STATES PATENTS
3,639,794   2/1972   Karpman et al. ................. 310/231

Primary Examiner—A. D. Pellinen
Assistant Examiner—Robert J. Hickey
Attorney, Agent, or Firm—Eric H. Waters

[57] ABSTRACT

The present invention relates to a contact device of a synchronous electric machine for the electric connection of the machine rotor winding to its exciter.

The essence of the invention is that in a contact device for a synchronous electric machine for the electric connection of the rotor winding to an exciter, comprising at least two conductors running from the exciter terminals to the rotor and placed inside the axial bore of the exciter shaft, at least two conductors running respectively from the rotor winding to the exciter and placed inside the axial bore of the rotor shaft, and contact elements ensuring an electric connection between the conductors running from the exciter terminals and respective conductors running from the rotor winding, each contact element, ensuring an electric connection of one of the conductors running from the exciter terminals to a respective conductor running from the rotor winding, has a movable contact made in the form of a body of a variable section tapering off with height, for example a wedge made from a conducting material. This wedge is disposed between two fixed contacts terminating wherein are the free ends of the conductors being connected, so as to be capable of moving in a radial direction and with its base turned to the axis of rotation of the rotor and exciter shafts. In the preferred embodiment of the proposed device, each wedge made from a conducting material has a through slot cut lengthwise between its contact surfaces, as well as through slots cut crosswise between its end surfaces. Besides, each wedge made from a conducting material is springed on the base side.

In this preferred embodiment, fixed contacts are the free ends of the conductors being connected whose end faces serve as contact surfaces and form an angle corresponding to or slightly less than the angle between the contact surfaces of the wedge made from a conducting material.

18 Claims, 9 Drawing Figures

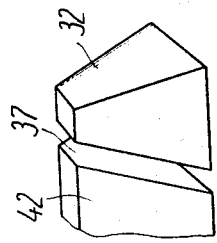
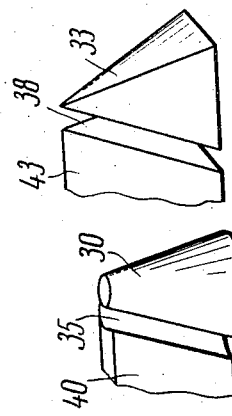
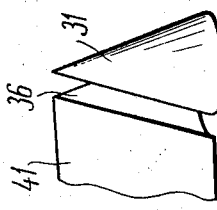
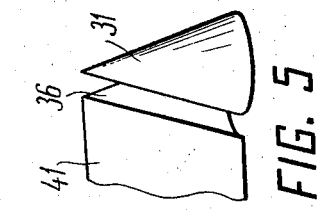
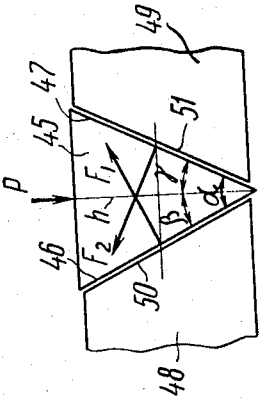
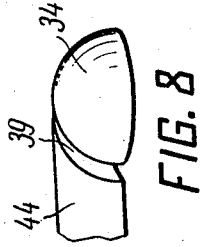
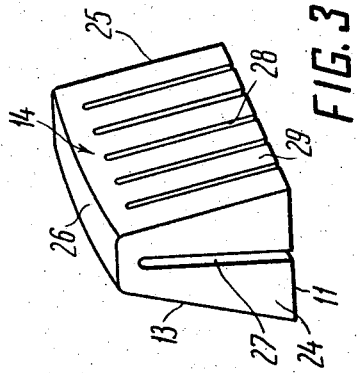

CONTACT DEVICE OF SYNCHRONOUS ELECTRIC MACHINE

The present invention relates to electric machines, and more particularly to a contact device of a synchronous electric machine for the electric connection of the machine rotor winding to its exciter.

Known in the art is a contact device of a synchronous electric machine comprising a brush rocker, slip rings fitted on the rotor shaft, as well as flexible buses, current-carrying bolts and bars arranged inside the axial bore of the shaft for the connection of the slip rings to the exciting winding. A disadvantage of this contact device resides in the provision of a sliding contact between the brushes and the slip rings which, at high currents and peripheral speeds of the rotor rotation, results in overheating and rapid wear of the brushes and slip rings. The overheating of the slip rings causes loosening of the fit between a slip ring and the rotor shaft and, consequently, intensive vibration of the slip rings which often results in a failure of this contact device.

The electric power energetics develops, in particular, along the lines of increasing the unit power of electric machines which is dictated by the necessity of increasing the power of and, consequently, the current intensity in a synchronous electric machine rotor. The development of unified energy systems has generated a need for taking steps to improve their dynamic stability. One of such steps resides in decreasing the reactance of synchronous electric machines which is also related to increasing the power of and, consequently, the current intensity in the rotor of such a machine.

At the same time, it is common knowledge that the degree of heating of a contact device, as with any other element of an electric circuit having a particular resistance, is directly proportional to the square of the current intensity.

From the foregoing it is obvious that the above-described contact device with a contact sliding between the brushes and slip rings cannot be reliable enough as the unit power of electric machines is on the increase.

Also known in the art is a contact device of a synchronous electric machine, comprising current-carrying bars arraned inside the axial bores of the electric machine rotor and the exciter shafts, as well as flexible annular current-carrying washers insulated from the shaft. The current-carrying bars placed inside the axial bores of the electric machine rotor and exciter shafts are made flexible and bolted to the flexible annular current-carrying washers. Though this particular contact device has no sliding contact, it suffers from a number of other disadvantages.

This device is too complicated in design.

Besides, its mounting presents severe problems: the flexible buses are not protected against the action of centrifugal forces which makes the device unreliable from mechanical point of view.

Known in the art is yet another contact device of a synchronous electric machine, comprising current-carrying bars arranged inside the axial bores of the electric machine rotor and exciter shafts, segments made from a conducting material, and contact elements in the form of pins spring-loaded to provide for the required contact pressure. This device has no sliding contact either, and it also suffers from the number of disadvantages.

One of these disadvantages is the small contact surface which is limited by the pin end face.

Another disadvantage is the difficulty in providing a contact pressure of the contact elements high enough to ensure a highly reliable and stable contact because the spring compression force diminishes in the course of time, especially as the contact elements are heated in operation.

It is an object of the present invention to provide a stable and reliable contact device of a synchronous electric machine for the electric connection of the machine rotor winding to its exciter free of the disadvantages described above and inherent in the prior-art contact devices of synchronous electric machines.

The basic object of the invention is to provide a contact device of a synchronous electric machine for the electric connection of the machine rotor winding to its exciter with contact elements ensuring a reliable electric contact due to centrifugal forces developing in the contact elements during the rotation of the synchronous electric machine rotor.

This object is achieved by that in a contact device of a synchronous electric machine for the electric connection of the machine rotor winding to an exciter, comprising at least two conductors running from the exciter terminals to the rotor and placed inside the axial bore of the exciter shaft, least two conductors running from the rotor winding to exciter and placed inside the axial bore of the rotor shaft, and contact elements ensuring the electric connection between the conductors running from the exciter terminals and respective conductors running from the rotor winding, each contact element has, according to the invention, a movable contact made in the form of a body of a variable section tapering off with height displaced, so as to be capable of moving in a radial direction, between two fixed contacts terminating wherein are the free ends of the conductors being connected, in such a manner that the distance between the axis of rotation of the rotor and exciter shafts and the thinner portion of the movable contact be greater than the distance between the axis of rotation of the rotor and exciter shafts and the thicker portion of said movable contact.

It is expedient that in the novel contact device of a synchronous electric machine, the movable contact of the contact element be made in the form of a wedge from a conducting material whose faces converging at the top serve as contact surfaces, and the fixed contacts be the free ends of the conductors being connected, the end faces of said conductors being contact surfaces and forming an angle corresponding to that between the contact surfaces of said wedge made from a conducting material.

It is also expedient that the wedge made from a conducting material have a through slot cut lengthwise between the contact surfaces from base to top.

It is desirable that the wedge made from a conducting material have through slots cut crosswise between the end surfaces limiting the contact surfaces, running in parallel from base to top.

It is also desirable that the wedges made from a conducting material be springed on the base side.

It is advisable that the sections of the free ends of the conductors being connected, facing the wedges made from a conducting material and coming out of the axial bores of the rotor and exciter shafts, be larger than the sections of those portions of the same conductors which are inside said bores, thus increasing the contact surface of the fixed contacts.

The proposed contact device can be most advantageously used in modern powerful synchronous electric machines with high speeds of rotation (1,000 to 3,000 rpm). It might be well to point out here that the novel device features high contact pressure between the movable and fixed contacts due to the centrifugal forces developing in the course of operation of the synchronous electric machine, which creates favorable conditions for ensuring a reliable contact with a low contact resistance. The absence of rigid coupling between individual components of the contact element (movable and fixed contacts) practically rules out any possibility of these components being broken and, consequently, of the whole device becoming disabled due to vibration. This factor is especially important when it is considered that as a rule, contact elements for the electric connection of conductors running from the exciter terminals to those running from the rotor winding are arranged at the ends of the shafts where vibration is maximum.

Another feature of the novel contact device is that practically ruled out is also any deterioration of the electric contact in the course of time while the device is in operation because it is so embodied that the centrifugal forces automatically take up any clearances between the contact surfaces that may appear in the course of operation, which is another factor making the device highly reliable.

The nature of the invention will be clear from the following description of an embodiment thereof with reference to the accompanying drawings, wherein:

FIG. 3 is an axonometric view of a movable contact of the contact element, made in the form of a wedge from a conducting material;

FIG. 4 is an axonometric view of the contact element with a movable contact made in the form of a truncated cone;

FIG. 5 is an axonometric view of the contact element with a movable contact made in the form of a cone;

FIG. 6 is an axonometric view of the contact element with a movable contact made in the form of a truncated pyramid;

FIG. 7 is an axonometric view of the contact element with a movable contact made in the form of a pyramid;

FIG. 8 is an axonometric view of the contact element with a movable contact made in the form of a hemisphere;

FIG. 9 is a simplified longitudinal section of the contact element.

Figure 1:
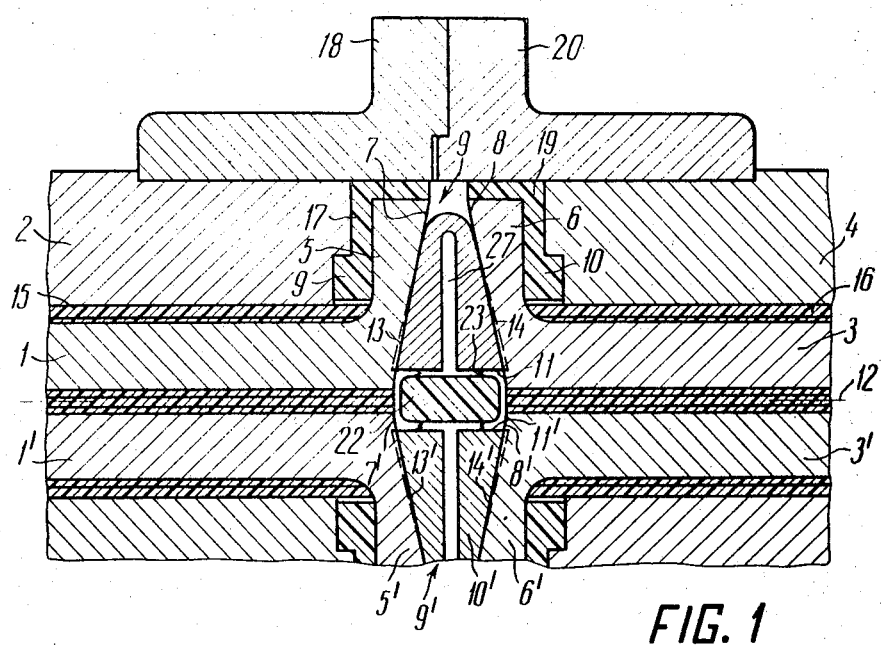
FIG. 1 is a longitudinal section of a contact device, according to the invention.

Referring now to the drawings, the novel contact device of a synchronous electric machine comprises two conductors in the form of current-carrying bars 1 and 1' (FIGS. 1 and 2) running from the rotor winding inside the axial bore of a rotor shaft 2, as well as two conductors in the form of current-carrying bars 3 and 3' running from the exciter terminals inside the axial bore of an exciter shaft 4. Said current-carrying bars 1, 1' and 3 3' are extended each to the end face of their respective shaft 2 or 4 and on to form, as they come out of the shaft bores, portions 5, 5' and 6, 6' whose cross-section is larger than that of those portions of the current-carrying bars 1, 1' and 3, 3' which are inside the axial bores of the rotor shaft 2 and the exciter shaft 4 respectively.

The portions 5, 5' of the current-carrying bars 1, 1' and 6, 6' of the current-carrying bars 3, 3' are the fixed contacts of the contact device and terminate in contact surfaces 7, 7' and 8, 8' respectively. The portions 5, 6 of the current-carrying bars 1, 3 are the fixed contacts belonging to a contact element 9 for the electric connection of these current-carrying bars 1, 3 while the portions 5', 6' of the current-carrying bars 1', 3' are the fixed contacts belonging to another contact element 9' for the electric connection of the current-carrying bars 1', 3'. Each contact element 9 and 9' comprises respectively a movable contact in the form of a wedge 10 (10') made from a conducting material.

The wedge 10 made from a conducting material, which is the movable contact of the contact element 9, is disposed between the contact surfaces 7 and 8 of the fixed contacts (portions 5 and 6 of the current-carrying bars 1 and 3) of the contact element 9.

The contact surfaces 7 and 8 are arranged, with respect to each other, at an angle corresponding to the apex angle of the wedge 10.

The wedge 10' made from a conducting material, which is the movable contact of the contact element 9', is displaced between the contact surfaces 7' and 8' of the fixed contacts (portions 5' and 6' of the current-carrying bars 1' and 3') of the contact element 9'. The contact surfaces 7' and 8', similarly to the contact surfaces 7 and 8, form an angle corresponding to the apex angle of the wedge 10'. The current-carrying wedges 10 and 10' are turned with their bases 11 and 11' on the rotation axis 12 of the rotor shaft 2 and the exciter shaft 4.

Two opposite lateral surfaces 13 and 14 of the wedge 10 are contact surfaces touching, respectively, the contact surfaces 7 and 8 of the fixed contacts (portions 5 and 6 of the current-carrying bars 1 and 3) of the contact element 9. In a similar manner, two opposite lateral surfaces 13' and 14' of the wedge 10' are contact surfaces touching, respectively, the contact surfaces 7' and 8' of the fixed contacts )portions 5' and 6' of the current-carrying bars 1' and 3') of the contact element 9'. The wedges 10 and 10' are arranged so as to be capable of moving in a radial direction (in a direction normal to the rotation axis 12 of the rotor and exciter shafts, as well as to their bases 11 and 11').

Those portions of the current-carrying bars 1 and 1' which are inside the axial bore of the rotor shaft 2 have an insulation 15. Likewise, those portions of the current-carrying bars 3 and 3' which are inside the axial bore of the exciter shaft 4 have an insulation 16. A box 17 made from an insulating material insulates the portions 5 and 5' of the current-carrying bars 1 and 1' from the rotor shaft 2 and a half-clutch 18, while a box 19 made from an insulating material insulates the portions 6 and 6' of the current-carrying bars 3 and 3' from the exciter shaft 4 and a half-clutch 20.

Besides, the insulating boxes 17 and 19 prevent the current-carrying wedges 10 and 10' from being displaced in a tangential direction.

The insulating boxes 17 and 19 are secured to the end faces of the rotor shaft 2 and the exciter shaft 4 by bolts 21. The wedges 10 and 10' are insulated from each other by a partition 22 made from an insulating material.

To properly fix the position of the wedges 10 and 10', as well as to prevent them from being periodically displaced as the speed of rotation of the synchronous electric machine varies, especially in starting and stopping the machine, the wedges 10 and 10' are springed on the side of their bases by springs 23. These springs may be flat or coiled.

The wedge 10 made from a conducting material such as electrical copper, brass, and the like, is shown in more detail in FIG. 3 wherein all the elements characterizing the geometry of the wedge are labelled as follows: 11 — base; 13, 14 — lateral surfaces which are contact surfaces; 24, 25—end surfaces; 26 — apex.

To ensure a more reliable contact between the contact surfaces of the movable and fixed contacts through intimate mating of respective contact surfaces in the course of operation of the synchronous electric machine, the wedge 10 made from a conducting material has a number of slots cut therein A through slot 27 is cut lengthwise between the lateral surfaces 13 and 14 from the base 11 to the apex 26 splitting the wedge from the end surface 24 to the end surface 25. Through slots 28 are cut crosswise between the end surfaces limiting the lateral ( contact) surfaces splitting the wedge from the lateral surface 13 to the lateral surface 14.

Figure 2:
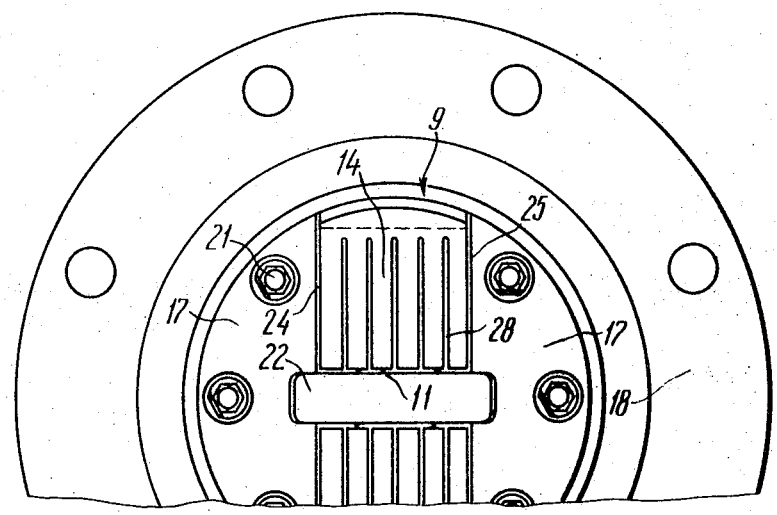
FIG. 2 is the longitudinal section of FIG. 1 as viewed from the end face of the synchronous electric machine rotor.

The through slot 27 cut lengthwise imparts the current-carrying wedge spring properties. The wedge 10 is made with an apex angle slightly greater than the angle between the contact surfaces 7 and 8 of the fixed contacts with which the wedge interacts, as is shown in FIG. 1 by the broken line.

The through slots 28 divide each lateral contact surface 13 and 14 into a plurality of separate contact surfaces 29.

For each lateral contact surface 13 or 14 of the wedge, there is always one separate contact surface 29 in excess of the number of the through slots 28 cut crosswise.

Owing to this, there are always much more points of tangency of the contact surfaces 13 and 14 of the current-carrying wedge 10 with the respective contacts surfaces 7 and 8 of the fixed contacts, which permits of considerably reducing the contact resistance of the contact element 9.

The wedge 10' is made from a conducting material similarly to the wedge 10. In this embodiment of the contact device of a synchronous electric machine, the movable contact is made from a conducting material in the form of a wedge. The movable contact, however, may be made in the form of any other body of a variable section tapering off with height, for example in the form of a truncated cone 30 (FIG. 4), a cone 31 (FIG. 5), a truncated pyramid 32 (FIG. 6), a pyramid 33 (FIG. 7), and even a hemisphere 34 (FIG. 8).

In this case, contact surfaces 35, 36, 37, 38 and 39 of fixed contacts 40, 41, 42, 43 and 44 must correspond to respective contact surfaces of the movable contacts 30, 31, 32, 33 and 34.

Evidently, the shape of the movable contact of the contact element and, accordingly, the type of the contact surfaces of the fixed contact are determined in accordance with the constructive design adopted for each particular embodiment of the electric machine. However, regardless of the embodiment of the movable contact of the contact element, said movable contact should be provided with through slots cut lengthwise from base to top to impart spring properties to the movable contact and, consequently, to improve the quality of the contact element as a whole. To increase the number of points of tangency of the contact surfaces of the movable contact with respective contact surfaces of the fixed contacts and hence to considerably reduce the contact resistance of the contact element, it is advisable that the movable contact be provided with through slots cut crosswise regardless of the shape of the movable contact.

Prior to mounting the synchronous electric machine and while the exciter is connected thereto, the angle between the contact surfaces 13 and 14 of the wedge 10 (FIG. 1), as well as between the contact surfaces 13' and 14' of the wedge 10' is slightly greater than the angle between the contact surfaces 7 and 8, as well as between the contact surfaces 7' and 8' of the fixed contacts 6, 6', 7 and 7' respectively. The outlines of the current-carrying wedges 10 and 10' are, for this case, shown by the broken line.

When the exciter is connected to the synchronous electric machine, the wedges 10 and 10' together with the insulating partition 22 are set into position between the contact surfaces 7, 7' and 8, 8' of the fixed contacts (portions 5,5' and 6,6' of the current-carrying bars 1, 1' and 3,3'). After bolting the half-clutches 18 and 20, the wedges 10 and 10' are slightly pressed together and the angle between the contact surfaces of each wedge is reduced a bit to become equal to the angle between respective contact surfaces of the fixed contacts.

The outlines of the wedges 10 and 10' shown in the drawing by the solid line are for the case when the contact device is fully assembled and when the exciter is connected to the synchronous electric machine.

The novel contact device operates as follows.

When the synchronous electric machine is started, the wedges 10 and 10' are subjected to the action of centrifugal forces like all the revolving parts of the synchronous electric machine.

These centrifugal forces become especially powerful at high rotation speeds of the rotor which speeds, as is the case with most large sized synchronous machines (turbogenerators), are equal to some 3,000 rpm.

Under the action of centrifugal forces, the wedges 10 and 10' which are the movable contacts of their respective contact elements 9 and 9' are displaced in a direction opposite to the axis of rotation of the rotor and exciter shafts, i.e. towards the periphery. A very high contact pressure is set up therewith between the contact surfaces of each movable and respective fixed contacts. This in turn ensures a large effective contact surface at the points of tangency of the movable contact with the fixed contacts, as well as a very low contact resistance in each contact element. The contact pressure which is normal to the contact surfaces may apparently be significantly higher than the radial centrifugal forces developed during the operation of the machine in the wedges 10 and 10' which are the movable contacts of the contact elements 9 and 9'. The less the angle between the contact surfaces 13, 14 and 13', 14' of the wedges 10 and 10', the more the contact pressure will exceed the centrifugal force developed in the wedges 10 and 10'.

It can be easily seen from FIG. 9 which is a simplified view of the contact element comprising a wedge 45 (movable contact) with contact surfaces 48 and 49, and fixed contacts 48 and 49 with contact surfaces 50 and 51 respectively. The following are the reference characters used in this drawing: α — apex angle of the wedge 45; P — centrifugal force acting upon the wedge 45 during the operation of the machine; $F_1$ — contact pressure set up during the operation of the machine between the contact surface 46 of the wedge 45 and the contact surface 50 of the fixed contact 48; $F_2$ — contact pressure set up during the operation of the machine between the contact surface 47 of the wedge 45 and the contact surface 51 of the fixed contact 49; h — height of the wedge 45; β — angle between the height h and the contact surface 46 of the wedge 45; γ — angle between the height h and the contact surface 47 of the wedge 45. In case the wedge is symmetrical, i.e. when $<\beta=<\gamma=\alpha/2$ and the contact pressures $F_1 = F_2 = F$, the relationship between the centrifugal force P and the contact pressure F is expressed as $$P = 2F\sin\alpha/2$$

Specifically, if the angle α=30°, the contact pressure will be almost twice as high as the centrifugal force $$F \cong 2P$$

This should be borne in mind in selecting the geometrical dimensions of the wedge made from a conducting material. As the synchronous electric machine is being stopped, the reduction in the rotation speed is accompanied by falling off of the centrifugal forces acting upon the wedges 10 and 10' and, consequently, by falling of the contact pressure in the contact elements, and, when the synchronous electric machine has come to a halt, the contact pressure is maintained only due to elastic deformations developed while the contact device was still being assembled.

This, however, does not, under any circumstances, affect the reliability of the contact device for the following reason.

Firstly, both in normal operation and in an emergency, the exciting circuit of a synchronous electric machine is energized by respective switchgear, usually by automatic field dampers, only after the rotation speed reaches a value approximating the rating, and the stoppage of the machine lasts from the moment it is disconnected from the supply with simultaneous de-energizing of the exciting circuit till a marked reduction in the rotation speed. Thus, when started or stopped, the synchronous electric machine operates at a speed much below the rating while the exciting curcuit is de-energized and no current flows through the contact elements of the contact device.

Secondly, even if the rotation speed of the synchronous electric machine perceptibly drops while its exciting circuit is not cut off by a respective switchgear, the electromotive force of the exciter will be reduced to such an extent due to a reduction in the rotation speed, and, at that, to a much greater extent than the rotation speed, that the intensity of the rotor current flowing through the contact elements is completely within the safe limits for these elements.

Besides, a sufficiently high initial contact pressure is ensured due to the elastic strain energy appearing during the assembly of the synchronous electric machine after connecting it to the exciter, and due to the springs 23 loading the wedges 10 and 10' which are the movable contacts of the contact elements 9 and 9' respectively.

As may be inferred from the above detailed description of an embodiment of the contact device of a synchronous electric machine, ensured therein is a large contact area between the contact surfaces of the movable and fixed contacts in each contact element and a high contact pressure set up during rotation under the action of centrifugal forces in the movable contacts (the wedges 10 and 10').

High contact pressure and pliability of the wedges 10 and 10', the latter property being due to the slot cut lengthwise, permit of avoiding errors in manufacturing and assembling the contact elements 9 and 9'. Thus, all conditions are provided to ensure minimum contact resistance of each contact element, which in turn prevents overheating of the element even if a current as heavy as thousands of amperes will flow therethrough. It should be noted that the springs 23 loading the movable contacts (the wedges 10 and 10') form no part of the current circuit and, consequently, are not heated by this current, thus retaining their initial elastic properties.

All this points to the fact that the novel contact device can find especially wide application in powerful high-rpm synchronous electric machines with heavy exciting currents wherein conventional methods for supplying current through a brush rocker and slip rings are unsuitable.

The novel contact device may at the same time be advantageously used in any other cases involving laying of conductors inside a plurality of joined shafts or pipes rotating at high speeds.

The novel contact device of a synchronous electric machine as described herein above has been successfully tested at the "Elektrosila" plant in Leningrad on a turbogene-rator having a power of 300 muVA. At present, this contact device is being successfully tested on a similar generator under service conditions at an operating power station.

What is claimed is:

1. A contact device of a synchronous electric machine for the electric connection of the rotor winding to an exciter comprising at least two conductors running from the exciter terminals to the rotor, said two conductors running from the exciter terminals to the rotor being placed inside the axial bore of the exciter shaft; at least two conductors running from the rotor winding to the exciter, said two conductors running from the rotor winding to the exciter being placed inside the axial bore of the rotor shaft; contact elements; each said contact element ensuring an electric connection of said conductor running from the exciter terminals to the rotor winding with a respective said conductor running from the rotor winding to the exciter; each said contact element, ensuring an electric connection of said conductor running from the exciter terminals to the rotor winding with a respective said conductor running from the rotor winding to the exciter, having a movable contact and fixed contacts terminating wherein are the free ends of said conductors electrically connected by said contact element; said movable contact being made in the form of a body of a variable section tapering off with height; said movable contact, made in the form of a body of a variable section tapering off with height, being disposed, so as to be capable of moving in a radial direction, between said two fixed contacts terminating wherein are the free ends of said conductors electrically connected by said contact element; said movable contact, made in the form of a body of a variable section tapering off with height, being disposed, so as to be capable of moving in a radial direction, between said two fixed contacts so as to be capable of moving in a radial direction in such a manner that the distance between the axis of rotation of the rotor and exciter shafts and the thinner portion of said movable contact be greater than the distance between the axis of rotation of the rotor and exciter shafts and the thicker portion of the same movable contact.

2. A contact device of a synchronous electric machine as claimed in claim 1, wherein said movable contact of said contact element, made in the form of a body of a variable section tapering off with height, is a wedge made from a conducting material the faces whereof converging at the apex serve as contact surfaces.

3. A contact device of a synchronous electric machine as claimed in claim 2, wherein said fixed contacts are the free ends of the conductors being connected, the end faces of said free ends of the conductors being connected serving as contact surfaces and forming an angle corresponding to that between said contact surfaces of said wedge made from a conducting material.

4. A contact device of a synchronous electric machine as claimed in claim 2, wherein said wedge made from a conducting material has a through slot cut lengthwise between said contact surfaces of said wedge from base to top.

5. A contact device of a synchronous electric machine as claimed in claim 3, wherein said wedge made from a conducting material has a through slot cut lengthwise between said contact surfaces of said wedge from base to top.

6. A contact device of a synchronous electric machine as claimed in claim 2, wherein said wedge made from a conducting material has a plurality of parallel through slots cut crosswise between the end surfaces limiting said contact surfaces, from base to top.

7. A contact device of a synchronous electric machine as claimed in claim 3, wherein said wedge made from a conducting material has a plurality of parallel through slots cut crosswise between the end surfaces limiting said contact surfaces, from base to top.

8. A contact device of a synchronous electric machine as claimed in claim 4, wherein said wedge made from a conducting material has a plurality of parallel through slots cut crosswise between the end surfaces limiting said contact surfaces, from base to top.

9. A contact device of a synchronous electric machine as claimed in claim 5, wherein said wedge made from a conducting material has a plurality of parallel through slots cut crosswise between the end surfaces limiting said contact surfaces, from base to top.

10. A contact device of a synchronous electric machine as claimed in claim 2, wherein said wedges made from a conducting material are springed on the base side.

11. A contact device of a synchronous electric machine as claimed in claim 3, wherein said wedges made from a conducting material are springed on the base side.

12. A contact device of a synchronous electric machine as claimed in claim 4, wherein said wedges made from a conducting material are springed on the base side.

13. A contact device of a synchronous electric machine as claimed in claim 5, wherein said wedges made from a conducting material are springed on the base side.

14. A contact device of a synchronous electric machine as claimed in claim 6, wherein said wedges made from a conducting material are springed on the base side.

15. A contact device of a synchronous electric machine as claimed in claim 3, wherein said free ends of the conductors being connected facing said wedges made from a conducting material and coming out of said axial bores of the rotor and exciter shafts have sections larger than the sections of those portions of said conductors which are inside said shaft bores, thus ensuring a greater contact surface of said fixed contacts.

16. A contact device of a synchronous electric machine as claimed in claim 5, wherein said free ends of the conductors being connected facing said wedges made from a conducting material and coming out of said axial bores of the rotor and exciter shafts have sections larger than the sections of those portions of said conductors which are inside said shaft bores, thus ensuring a greater contact surface of said fixed contacts.

17. A contact device of a synchronous electric machine as claimed in claim 6, wherein said free ends of the conductors being connected facing said wedges made from a conducting material and coming out of said axial bores of the rotor and exciter shafts have sections larger than the sections of those portions of said conductors which are inside said shaft bores, thus ensuring a greater contact surface of said fixed contacts.

18. A contact device of a synchronous electric machine as claimed in claim 14, wherein said free ends of the conductors being connected facing said wedges made from a conducting material and coming out of said axial bores of the rotor and exciter shafts have sections larger than the sections of those portions of said conductors which are inside said shaft bores, thus ensuring a greater contact surface of said fixed contacts.

* * * * *